(12) United States Patent
Ainslie et al.

(10) Patent No.: US 11,340,004 B2
(45) Date of Patent: May 24, 2022

(54) METHOD AND APPARATUS FOR PRODUCING AND STORING A FLOWABLE SLUSH, PARTICULARLY FOR ICE PIGGING

(71) Applicant: SUEZ INTERNATIONAL, Paris La Defense (FR)

(72) Inventors: Eric Allan Ainslie, Pucklechurch (GB); Dominic George Ian Ash, Pucklechurch (GB); Timothy John Deans, Pucklechurch (GB); Martin Herbert, Pucklechurch (GB)

(73) Assignee: Suez International, Paris (FR)

( * ) Notice: Subject to any disclaimer, the term of this patent is extended or adjusted under 35 U.S.C. 154(b) by 68 days.

(21) Appl. No.: 16/490,889

(22) PCT Filed: Jun. 6, 2018

(86) PCT No.: PCT/EP2018/064903
§ 371 (c)(1),
(2) Date: Sep. 3, 2019

(87) PCT Pub. No.: WO2018/228887
PCT Pub. Date: Dec. 20, 2018

(65) Prior Publication Data
US 2020/0116410 A1    Apr. 16, 2020

(30) Foreign Application Priority Data
Jun. 15, 2017    (EP) ...................................... 17305736

(51) Int. Cl.
*F25C 5/18*        (2018.01)
*F25C 1/00*        (2006.01)
*B08B 9/055*       (2006.01)

(52) U.S. Cl.
CPC .............. *F25C 5/18* (2013.01); *B08B 9/0555* (2013.01); *F25C 1/00* (2013.01);
(Continued)

(58) Field of Classification Search
CPC ........ F25C 5/18; F25C 1/00; F25C 2301/002; F25C 2600/04; F25C 2700/08; F25C 5/00; B08B 9/0555; A23G 9/045
(Continued)

(56) References Cited

U.S. PATENT DOCUMENTS 2,699,045 A * 1/1955 Bailey ...................... F25C 1/00
                                                     62/57
3,194,540 A * 7/1965 Hager ...................... A01J 11/16
                                                    366/305

(Continued)

*Primary Examiner* — Eric S Ruppert
*Assistant Examiner* — Kirstin U Oswald
(74) *Attorney, Agent, or Firm* — Harness Dickey & PiercePLC

(57) ABSTRACT

An apparatus for generating and storing in a tank 22 a flowable slush 2 of frozen particles usable inter alia in Ice Pigging™ includes a control system 100 which is arranged to monitor an operating parameter OP of an agitator 23 in the storage tank. The control system initiates a slush comminution and separation or dewatering cycle when a control parameter CP based on the operating parameter OP reaches a threshold value CPt. The control parameter may represent a cumulative energy input to the storage tank 22. Comminution may be performed prior to separation, with the treatment cycle being terminated when a sensed rheometric parameter RP of the slush circulating in the treatment flowpath reaches a target value RPt.

15 Claims, 4 Drawing Sheets

(52) U.S. Cl.
CPC .... *F25C 2301/002* (2013.01); *F25C 2600/04* (2013.01); *F25C 2700/08* (2013.01)

(58) Field of Classification Search
USPC .......................................................... 62/54.1
See application file for complete search history.

(56) References Cited

U.S. PATENT DOCUMENTS

| | | | | |
|---|---|---|---|---|
| 3,521,458 | A * | 7/1970 | Hemstreet | F25J 1/0065 62/54.1 |
| 3,933,001 | A * | 1/1976 | Muska | F17C 7/00 62/54.1 |
| 4,401,449 | A * | 8/1983 | Martin | F25C 1/00 62/330 |
| 5,005,364 | A * | 4/1991 | Nelson | F25C 5/00 62/76 |
| 5,708,197 | A * | 1/1998 | Todd | G01N 11/14 73/54.28 |
| 6,012,298 | A * | 1/2000 | Goldstein | F25C 5/20 62/185 |
| 7,603,868 | B2 * | 10/2009 | Sveinsson | C09K 5/066 62/76 |
| 2001/0041210 | A1 * | 11/2001 | Kauffeld | A23G 9/045 426/590 |
| 2008/0072609 | A1 * | 3/2008 | Ikeuchi | F25J 1/004 62/54.1 |
| 2009/0255276 | A1 * | 10/2009 | Kasza | F25C 1/00 62/68 |
| 2012/0234552 | A1 * | 9/2012 | Vaughan | E02F 7/005 166/352 |

* cited by examiner

METHOD AND APPARATUS FOR PRODUCING AND STORING A FLOWABLE SLUSH, PARTICULARLY FOR ICE PIGGING

This invention relates to systems for producing a slush of water ice or other frozen particles as used for example in Ice Pigging™.

In this specification, a slush or slurry is a mixture of liquid and solid particles produced by partially freezing the liquid, and a liquid is taken to include for example flowable gels anti thixotropic products.

Flowable frozen slurries, often but not necessarily of water ice, are used for various purposes including for example for chilling food products, for storing energy in air conditioning systems, in medical treatments, and in Ice Pigging™ where a slush is forced under pressure through a pipeline to remove contamination. Usually a freezing point depressant (e.g. salt, sugar, citric acid, or any other suitable substance) is added to the water or other liquid prior to freezing; the freezing point depressant becomes concentrated in the remaining liquid fraction as the solid fraction increases, depressing the freezing point of the remaining liquid fraction. This ensures that the slush retains a liquid fraction and so remains flowable through a wide temperature range.

Where the slush is to be used for pigging a pipeline used to transport a liquid product, e.g. a foodstuff, it may be produced by freezing a fresh batch of the product to obviate the need tor further cleaning following the pigging operation.

The effectiveness of a slush used for Ice Pigging™ depends importantly on its solid traction. In order to form a plug which has sufficient wall shear to exert a cleansing action on the pipe wall while adapting to complex flowpath geometries, a slush for use in Ice Pigging™ will generally have a substantially higher solid fraction than a free flowing slush as commonly used for thermal storage, food processing or other applications.

Various techniques are known tor producing a slush, including scraped surface heat exchangers in which a liquid is partially frozen by contact with a cooled surface before the ice crystals are removed by scraping from the surface. A known scraped surface heat exchanger suitable for use in producing a water ice slush for use in Ice Pigging™ is shown by way of example in FIG. 1.

Extensive research on Ice Pigging™ has been carried out at the University of Bristol, resulting in published work including Ainslie, E. A. Ice Pigging in the Water Industry. December 2010. D. Eng. Thesis, University of Bristol. (Available at http://ethos.bl.uk/OrderDetails.do?uin=uk.bl.ethos.573410).

Ainslie (2010) describes the use of water ice slush in Ice Pigging™ of water distribution pipelines, and at pp. 200-230 gives details of a slush production and storage system suitable for this purpose.

It is known that the flow characteristics of a slush depend not only on its solid fraction but also on the shape and size of the solid particles, and will change over time as ice crystals develop and solid particles melt or agglomerate. If the slush is allowed to remain still then the remaining solid fraction will gradually solidify into a rigid mass.

When a slush is to be stored in a tank for a period of time before use, it is usual therefore to provide an agitator which continuously mixes the stored slush to maintain it in a flowable or homogenous condition. The solid fraction can be estimated by measuring the power consumption or torque reaction of the agitator.

However, "attempting to predict the overall behaviour of a given mixing regime is particularly difficult" (Ainslie (2010), p. 32). In practice therefore, despite the presence of the agitator, and in order to ensure that, the slush has the required particle size as well as overall viscosity and solid fraction, it is found necessary periodically to rejuvenate the stored slush by comminuting the solid particles and removing surplus liquid in a timed treatment cycle before returning it to the tank. Since comminution tends to accelerate melting, the treatment cycle must be repeated frequently.

By way of example, the AQL500 Ice Pigging™ Machine, available from SUEZ Advanced Solutions UK of Bristol, United Kingdom (www.ice-pigging.com) incorporates a slush generator with a scraped surface heat exchanger, and a storage tank for holding the ice slush until it is required for pigging. The machine is arranged to agitate the slush stored in the tank and periodically to circulate it through a flowpath in a treatment cycle which rejuvenates it before returning it to the tank. The treatment cycle includes a high shear pump which comminutes the solid particles, and a separator which separates a portion of the liquid contained in the slush and returns it to the heat exchanger where it is re-frozen and returned as fresh slush to the tank.

A simplified piping and Instrumentation diagram of the AQL500 Ice Pigging Machine™ is reproduced in two complementary parts in FIGS. 2A-2B.

In view of the difficulty of maintaining the flow characteristics of a stored slurry, it is a general object of the present invention to provide a method and apparatus with a more satisfactory storage regime for producing a flowable slush of frozen particles and storing the slush prior to use, particularly for Ice Pigging™.

Accordingly in its various aspects the present invention provides a method and an apparatus for producing a flowable slush of frozen particles as defined in the claims.

The novel apparatus includes a cooling means for partially freezing a liquid to form the flowable slush, a tank for storing the flowable slush, a powered agitator for agitating the flowable slush within the tank, a separator for separating a portion of the liquid remaining in the flowable slush stored in the tank from the frozen particles in a separation phase of a treatment cycle, and a comminution means for comminuting the frozen particles in the flowable slush stored in the tank in a comminution phase of the treatment cycle. The treatment cycle is controlled by a control system which senses at least one operating parameter of the agitator. The control system is arranged to monitor a control parameter based or at least the sensed operating parameter of the agitator, and to initiate the treatment cycle responsive at least to the control parameter reaching a threshold value.

The control parameter may represent a momentary or instantaneous value of the operating parameter, so that the treatment cycle may be initiated for example when agitator power or torque exceeds a threshold value.

More preferably however the control parameter represents a cumulative energy input to the flowable slush stored in die tank over a reference time period. In a particularly preferred embodiment the control parameter is based on the sensed operating parameter which represents the power input to the agitator together with the calculated ambient heat load on the storage tank over the reference time period.

Despite the difficulty in predicting the progress of crystal growth and agglomeration processes within the tank under any given agitation regime, it is surprisingly found that cumulative energy input is a reliable predictor of the rate at which the flow characteristics of a stored slush with high solid fraction change over time. It is therefore possible to delay the treatment cycle until the cumulative energy input to the tank reaches a predefined limit, without compromising the quality of the slush when it is delivered from the tank.

Further more specific objects, features and advantages will become evident from the illustrative embodiments which will now be described, purely by way of example and without limitation to the scope of the claims, and with reference to the accompanying drawings, in which:

Reference numerals appearing in more than one of the figures indicate the same or corresponding parts in each of them.

In this specification, the solid fraction is taken to be the proportion of solid particles by total volume of the slush when measured by the calorimetric method. An easy approximation of the solid fraction may be obtained by the cafetiere method. Both methods are well known in the art and explained for example in Ainslie (2010).

Figure 3:
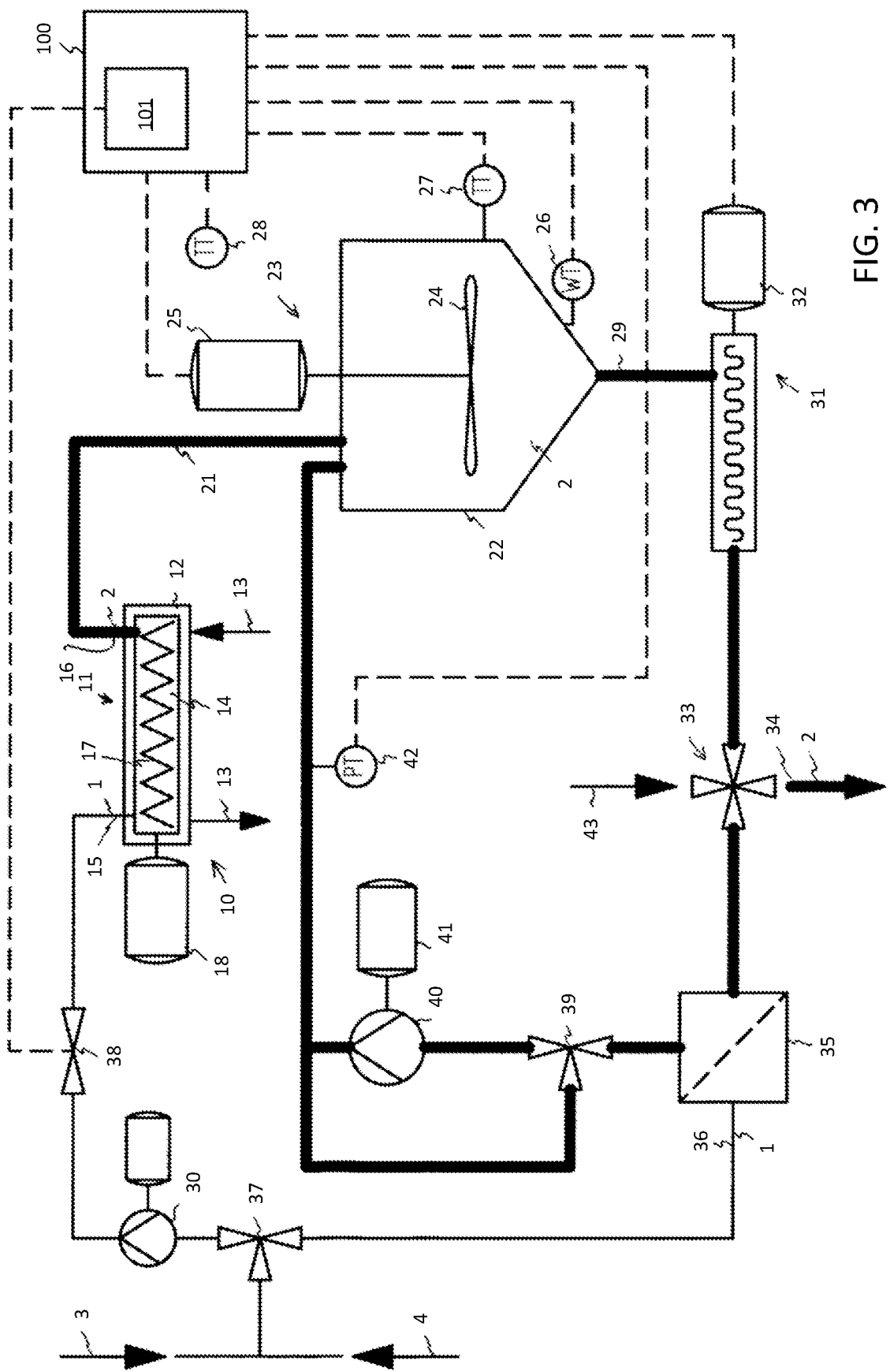
FIG. 3 shows an apparatus for producing and storing a flowable slush in accordance with an embodiment of the invention.

Referring to FIG. 3, an apparatus for producing a flowable slush of frozen particles is shown in simplified form, with liquid flowpaths shown as solid lines and slush flowpaths shown as heavy solid lines. The apparatus includes a control system 100 including processing and memory means as known in the art, with selected ones of the signal and control inputs and outputs represented by broken lines. For clarity only some of the flowpaths and signal or control lines are shown. It will be understood of course that in practice, additional flowpaths, valves, sensors and other functional elements will be provided, and all of the sensed or controllable functional elements (whether depicted in FIG. 3 or not) will be connected to the control system.

Figure 1:
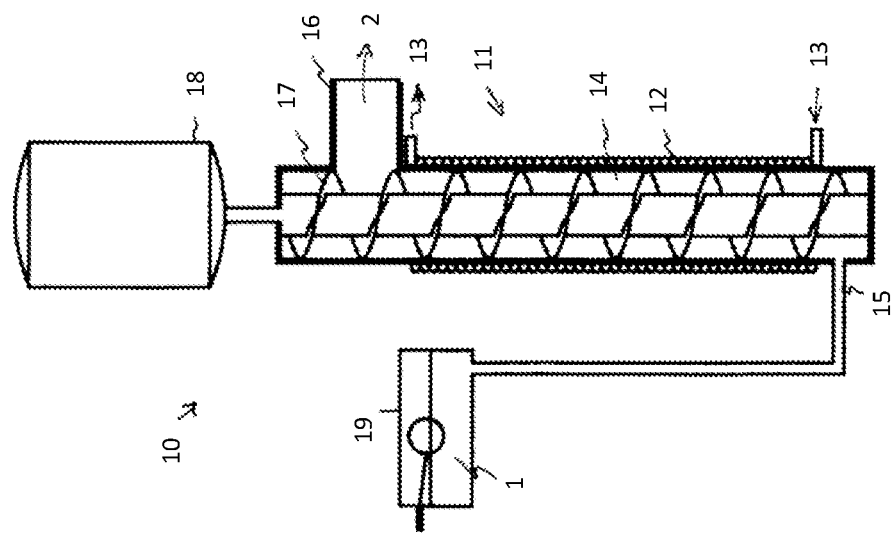
FIG. 1 shows a known scraped surface heat exchanger for use in producing a water ice slush.

The apparatus includes a slush generator 10 with a cooling means 11 for partially freezing a liquid 1 (which is to say, freezing some of the liquid) to form the flowable slush 2. The cooling means 11 may comprise a scraped surface heat exchanger of the type shown in FIG. 1, which has a heat exchanger jacket or coil 12 carrying a flow of coolant 13 such as brine or refrigerant, vapour and surrounding a generally vertical chamber 14 with an inlet 15 for the water or other liquid 1 to be frozen, and an outlet 16 for the slush 2 of liquid and solid particles which are scraped from the wall of the chamber by a helical screw or auger 17 driven in rotation by a motor 18. The liquid 1 is fed to the inlet 15 from a tank 19 which maintains a constant head within the chamber. Conveniently, it is found that the auger 17 will exert a pumping action on the slush which is proportionate to its speed of rotation and the solid fraction of the slush, so that by controlling the speed of rotation of the auger a slush of the desired solid fraction will be delivered from the outlet 16.

Figure 2B:
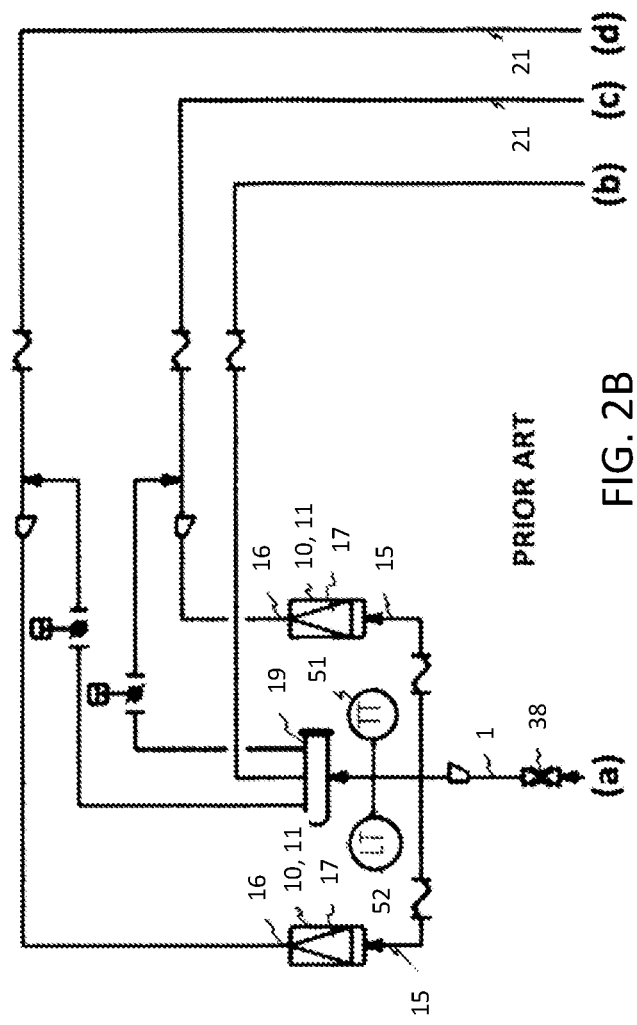
FIGS. 2A and 2B are a simplified piping and instrumentation diagram of the known AQL500 Ice Pigging™ Machine.

When used to produce a slush of water ice, water 3 and an additive 4 comprising a freezing point depressant at a known concentration are mixed in defined proportions and supplied via a liquid feed pump 30 to the slush generator 10. When used for Ice Pigging™ it is preferred that the slush have a solid fraction of at least 40%, preferably at least 50%. In a particularly preferred implementation, the rotational speed of the auger is controlled by the control system 100 using a control algorithm with an input from a liquid feed temperature sensor (FIG. 3, not shown; FIG. 2B, 51) to achieve a solid fraction of approximately 55%.

The flowable slush 2 is delivered from the outlet 16 via a feed pipe 21 to a storage tank 22 in which it is stored until required for use. A powered agitator 23 comprising one or more agitator elements (typically rotating blades) 24 driven in rotation by one or more motors 25 is provided for agitating the flowable slush within the tank. The control system 100 is arranged to control and supply power to the motor(s) 25 of the agitator 23 so as to rotate the agitator elements 24 continuously or intermittently at a constant or variable speed which reflects not only the power supplied to the motor but also the mass and viscosity of the slush in the tank. An increased mass or viscosity will apply more torque reaction and hence reduce the agitator speed or increase the power consumption of the motor. The generation of slush may terminate for example when the target volume of liquid has been delivered to the slush generator 10 or when the target mass of slush is present in the storage tank 22, as measured for example by load cells 26 on which the tank 22 is supported.

The control system includes means for sensing at least one operating parameter OP of the agitator, which may be for example the power consumption and/or speed of the agitator motor 25 and/or the torque reaction of the agitator element(s) 24 as they are rotated by the motor. In either case it will be appreciated that the operating parameter OP represents a power input to the agitator. If sensed over a reference time period, the operating parameter OP thus represents over the reference time period a cumulative energy input to the agitator and hence to the slush 2 stored in the tank. Suitable sensing means are well known in the art, and may comprise for example a motor controller or power monitoring circuit or a transducer responsive to agitator shaft torque.

The control system is configured to monitor a control parameter CP, and to initiate a treatment cycle responsive at least to the control parameter reaching a threshold value CPt. The threshold value CPt may be fixed or variable and may be determined empirically or by calculation from system parameters and stored within a memory of the control system 100. In normal operation therefore the treatment cycle is not performed until the control parameter CP reaches the threshold value CPt. (Of course, the control system may be configured to provide alternative operating modes in which the treatment cycle may be performed alternatively responsive to another initiation signal, e.g. from a timer or manual control.)

The control parameter CP is based on at least the sensed operating parameter OP of the agitator. The control parameter CP may simply be the operating parameter OP or may be generated by an algorithm based on the operating parameter OP, optionally together with other inputs such as the volume or mass of slush stored in the tank (e.g. as measured by load cells 26), motor speed or supply voltage, etc.

In a simple implementation, the threshold value CPt may be a threshold power input or torque reaction of the agitator, either as an instantaneous value or an average value over a defined time period measured e.g. in seconds or minutes. In this case the treatment cycle may be initiated when the power input or torque reaction reaches the threshold value, the increased load on the agitator reflecting an increase in viscosity of the slush stored in the tank.

Surprisingly, even in this simple implementation, the quality of the slush stored in the tank after a period of storage without rejuvenation may still be acceptable for many practical Ice Pigging™ scenarios. By carrying out the treatment cycle less frequently and responsive to the actual condition of the slush (reflecting inter alia the ambient temperature and other unpredictable parameters of the particular use situation), the total energy input to the stored slush over time is reduced so that the slush generation and storage process becomes more energy efficient.

However, the viscosity of the stored slush will reflect not only melting but also other processes such as crystal growth and agglomeration occurring concurrently with melting. Moreover, depending only in part on the agitator and tank design, the slush stored within the tank may not be homogenous but may form one or more discrete bodies which interact more or less unpredictably with the agitator. The instantaneous torque reaction of the agitator element 24 therefore may be complexly or somewhat weakly correlated with the quality of the slush stored within the tank.

It is surprisingly found that a relatively stronger correlation exists between slush quality and cumulative energy input to the storage tank, so that the quality of the slush delivered from the tank can advantageously be maintained within narrower limits by initiating the treatment cycle responsive to the measured cumulative energy input to the tank over a reference time period starting from the last treatment cycle or initial filling of the tank.

In this case, the control parameter CP is calculated as a cumulative value over the reference time period, representing the cumulative energy input to the stored slush over the reference time period. The operating parameter OP of the agitator (whether measured as torque reaction, motor armature current, and/or another parameter or group of interrelated parameters) will be representative of the power input to the agitator and so, when measured over time, of the energy input to the agitator.

The control parameter is based on the sensed operating parameter of the agitator over the reference time period, optionally in combination with one or more additional parameters. It is particularly preferred to base the control parameter CP on the operating parameter OP of the agitator in combination with a temperature $\Delta T$ between a first temperature T1 of the liquid 1 or flowable slush 2 and an ambient temperature T2 external to the tank. The first temperature T1 may be measured by a first temperature sensor 27 at any convenient point, for example, in the flowpath or (as shown) in the storage tank 22. The ambient temperature T2 may be measured by a second temperature sensor 28 external to the storage tank 22.

Figure 4:
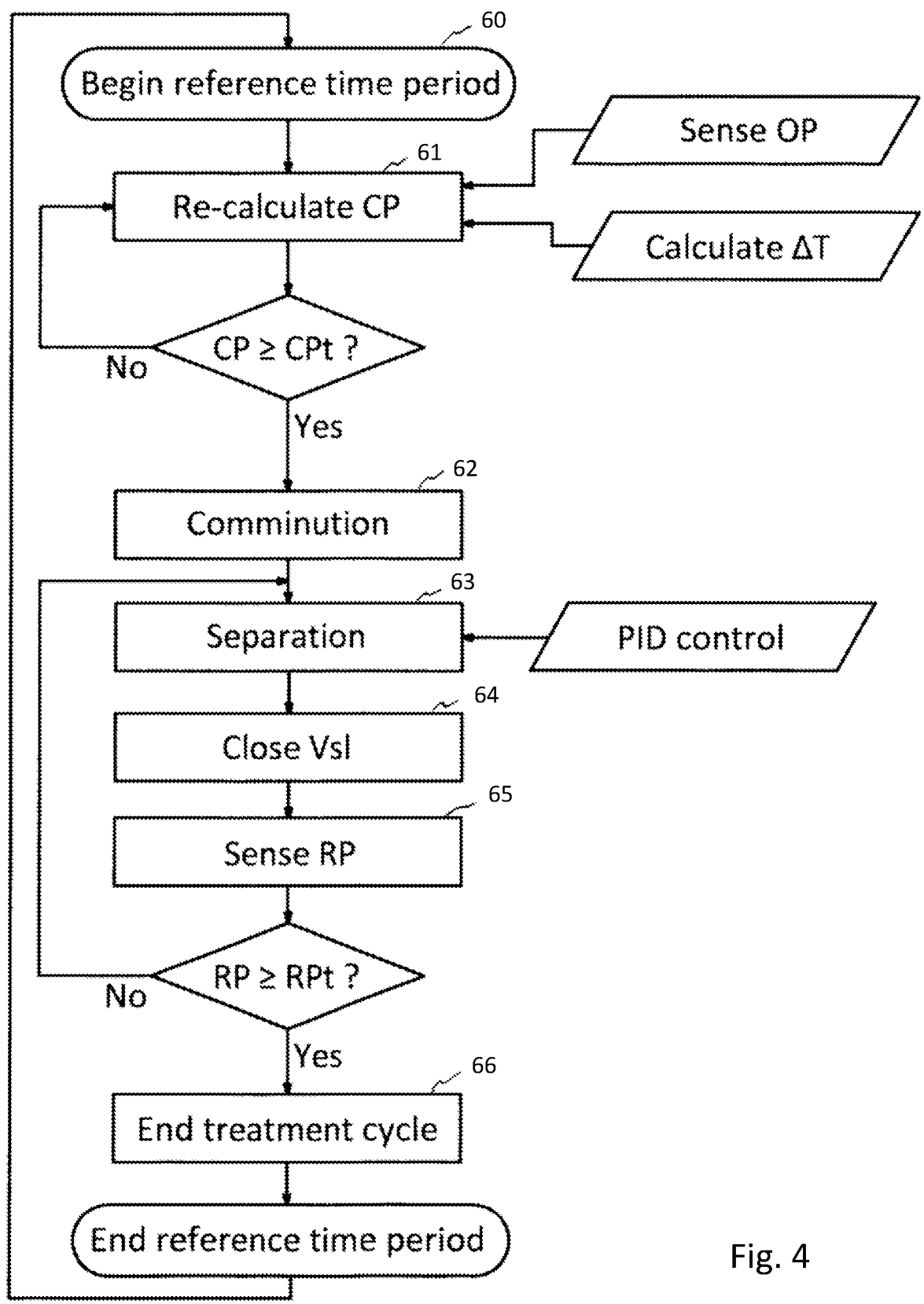
FIG. 4 is a flowchart showing the treatment cycle of the apparatus of FIG. 3.

In practice, the temperature differential may be calculated based also on a heat transfer coefficient U reflecting the geometry, capacity and other characteristics of the storage tank 22 as determined by experimental data analysis, optionally in combination with the volume or mass of stored slush which may be indicated by the output of the load cells 26. Referring to FIG. 4, the control parameter CP may be reset to zero at the beginning of the reference time period (step 60), and then Iteratively recalculated at step 61 by incrementing its initial value over successive time increments until the threshold value CPt is reached, which marks the comminution phase (step 62) at the beginning of the treatment cycle which terminates the reference time period. Each increment of CP may be calculated using the simplified formula as shown below, wherein AE is the agitator energy input over the respective time increment based on the sensed operating parameter OP:

$$CP=AE+U(T2-T1)$$

The apparatus may include at least one slush pump 31, conveniently a progressive cavity pump driven by a motor 32 as shown, which pumps the stored slush from an outlet 29 of the tank to a valve 33 which is controlled by the control system 100 to direct the slush 2 either to a final outlet 34, which may be connected to external pipework to be pigged, or to circulate through a treatment flowpath and back to the tank. After discharging the slush from the final outlet 34, the valve 33 may be configured to deliver a high volume flow of liquid 1 from inlet 43 to the final outlet 34 to force the pig of slush through the pipework.

The treatment flowpath passes through a separator 35, which may be formed as a perforated tube enclosed within an outer casing having a liquid outlet 36. In use, the pressure applied by the slush pump 31 forces the liquid 1 out of the slush 2 through the perforated tube into the casing. Valve 37 is operable by control system 100 to selectively connect the outlet 36 to the liquid pump 30 which delivers the separated liquid 1 via a separated liquid valve (Vsl) 38 to the slush generator 10 to be re-frozen and returned to the tank 22, although if preferred it could of course be drained to waste.

Valve 39 is operable by control system 100 to selectively direct the slush flowing through the perforated tube of the separator 35 either directly back to the tank 22 or back to the tank via a comminution means 40, which may comprise a high shear pump driven by a motor 41 which is also controlled by the control system 100.

During the treatment cycle, the slush 2 stored in the tank 22 is treated by circulating it by means of the slush pump 31 through each of the separator 35 and the comminution means 40 and back to the tank 22. The separator separates a portion of the liquid 1 remaining in the slush 2 from the frozen particles in the separation (e.g. dewatering) phase, while the comminution means comminutes the frozen particles to obtain a target particle size (e.g. around 3 mm) in the comminution phase.

The circulation via the separator and comminution means may be simultaneous or sequential in a single pass through the flowpath, so that the separation and comminution phases occur simultaneously.

Preferably however the control system is arranged to initiate the treatment cycle with the comminution phase, which is to say, the comminution phase begins before the separation phase, and preferably ends before the separation phase begins. Further preferably, most or substantially all of the slush stored in the storage tank 22 is passed through the comminution means 40 and back to the tank in step 62 (FIG. 4) to complete the comminution phase before the separation phase begins at step 63.

Further preferably, the control system is arranged to sense a rheometric parameter RP of the slush, to initiate the separation phase 63 following the comminution phase 62, and at step 66 to terminate the separation phase and hence the treatment cycle responsive at least to the sensed rheometric parameter RP reaching a threshold value RPt.

In this specification, a rheometric parameter RP is a parameter indicative of a flow characteristic of the slush 2.

When the slush 2 is generated from a liquid 1 containing a known freezing point depressant in an accurately predetermined concentration, the solid fraction of the slush will be proportionate to its temperature and so can be calculated by sensing the temperature of the slush. However, where a water ice slush has a solid fraction of 50% or more, a temperature change of 1° C. will correspond to a change of about 12% in the solid fraction when salt is used as the freezing point depressant, or as much as 30% with a less effective freezing point depressant such as sugar or citric acid. The calculated solid fraction is therefore highly sensitive to inaccuracies in the temperature measurement.

It is also known to estimate the solid fraction by measuring the power consumption or torque reaction of the agitator in the storage tank. However, as discussed above with reference to the control parameter CP, the interaction between the slush and the agitator may not provide a reliable indication of the slush flow characteristics.

It contrast, it Is found that when the slush is circulated through a flowpath, the flow resistance as measured for example ty the torque or power consumption of the slush pump or the pressure drop over a defined portion of the flowpath will reflect the particle size and solid fraction but is insensitive to the temperature or chemical composition of the slush. Accordingly it is preferred to pump the slush out of the storage tank, through a flowpath and back to the tank, and to measure the rheometric parameter RP as the slush flows through the flowpath.

Preferably therefore a rheometric sensing means is arranged in a flowpath of the flowable slush to sense the rheometric parameter RP of the flowable slush circulating through the flowpath during the treatment cycle.

In the illustrated example, the rheometric sensing means comprises a pressure sensor 42 which senses the rheometric parameter RP as a pressure of the flowable slush 2 in the flowpath while the slush pump 31 rotates at a constant rate or while the control system senses the torque and/or speed and/or power input to its motor 32. The sensing is conveniently carried out as the slush circulates through the flowpath during the separation phase, although it could be carried out during the comminution phase, in a separate sensing phase, or even via a separate flowpath. In alternative arrangements the rheometric parameter RP might be based for example on the torque or power input to the slush pump motor 32 or on the pressure drop between two pressure sensors spaced apart along a predefined port on of the flowpath.

In the illustrated embodiment, the control system comprises a PID controller 101 which adjusts the separated liquid valve (Vsl) 38 responsive to the sensed motor torque or power input of the slush pump 31 to control the pressure of the separated liquid within the casing of the separator 35 and hence the rate at which liquid 1 is extracted from the slush 2 flowing through its perforated tube.

Referring again to FIG. 4, the separated liquid valve (Vsl) 38 is also operated by the control system to control the flow of the separated portion of the liquid 1 from the separator by closing it periodically during the treatment cycle at step 64 to interrupt the flow of liquid 1 from the separator 35. The pressure at sensor 42 is sensed as the rheometric parameter HP at step 65 while the separated liquid valve (Vsl) 38 is closed, so that the pressure drop at the separator does not affect the measurement of the rheometric parameter RP. Of course, another valve such as valve 37 could alternatively be used for this purpose.

It will be understood of course that the flow resistance of the slush reflects inter alia both its solid fraction and its particle size. Moreover, the comminution phase represents an energy input and hence accelerates melting. Advantageously therefore, by measuring the rheometric parameter HP after completing the comminution phase, the rheometric parameter RP provide; an indication of the solid fraction at the target particle size, and so that the treatment cycle can terminate without further melting when the threshold value RPt is achieved.

This method provides an accurate and repeatable measure of the rheometric parameter which reliably indicates the quality of the slush in use, particularly for a slush of 50% solid fraction or more where the quality of the slush is critically dependent on its solid fraction and particle size, for example, as key determinants of wall shear when used for Ice Pigging™ of a pipeline. However, by relying on an active, pumped cycle to measure the rheometric parameter RP the method necessarily requires an energy input from the slush pump to perform the measurement, which accelerates the process of melting. For this reason the method might be regarded as less energy efficient than a more passive approach which derives the rheometric parameter RP for example from the agitator torque or power input.

However, by delaying the initiation of the treatment cycle (and hence the pumped circulation during which the rheometric parameter RP is measured) until the control parameter threshold value CPt is reached, the frequency and hence the net energy input of the treatment cycle is minimised. In its preferred embodiments, the novel method thus represents a net increase in overall energy efficiency despite incurring an energy cost when compared with a mere passive storage regime.

Figure 2A:
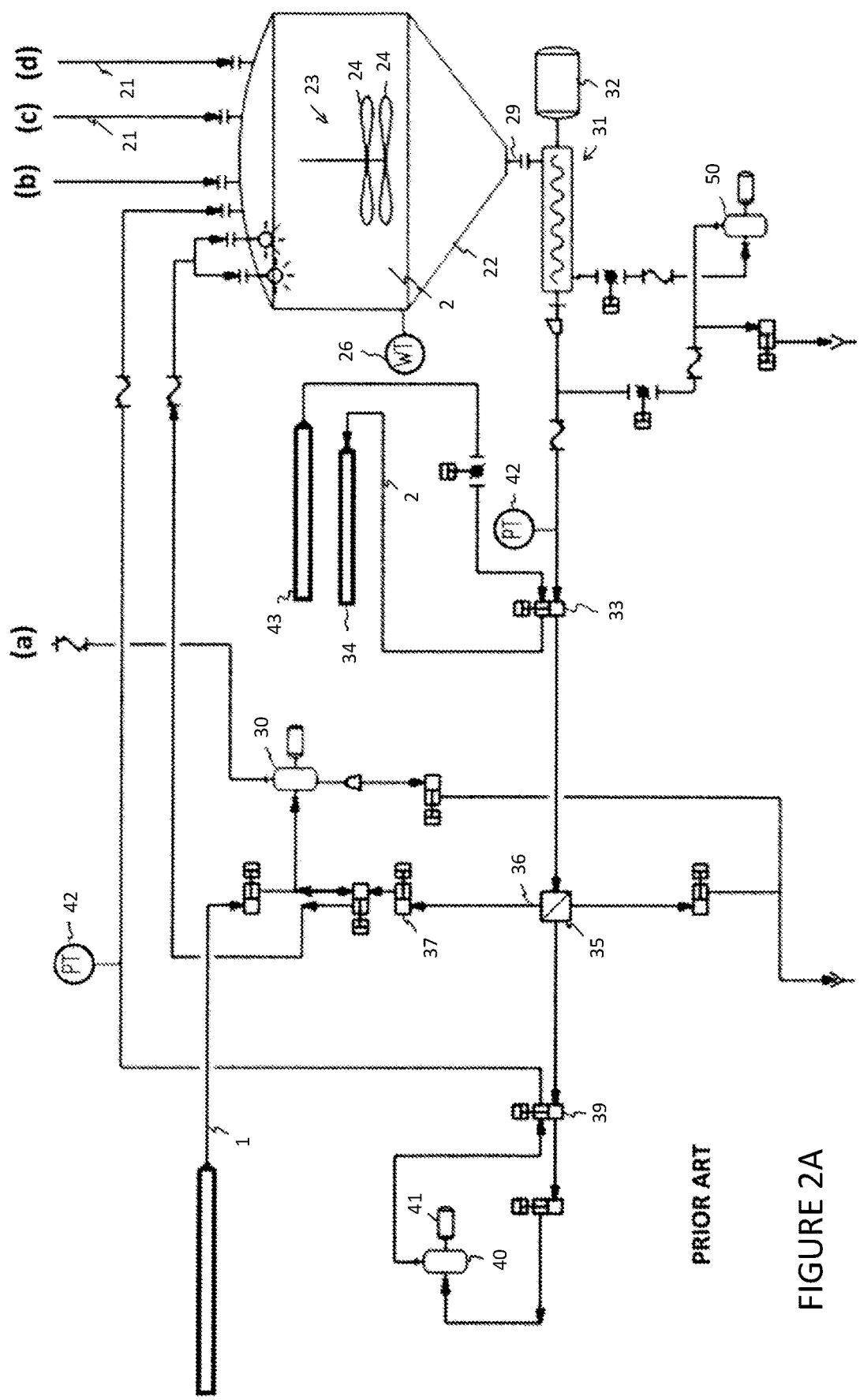

Referring now to FIGS. 2A and 2B, a known slush generation and storage apparatus may be adapted to operate with a control system (not shown) generally as described above, with like elements being represented by the same reference numerals. In the example shown there are twin agitator elements 24 and two slush generators 10 arranged in parallel, together with a cleaning pump 50 and ancillary flowpaths and additional valves to facilitate cleaning of the pipework, and additional functional elements such as a level sensor 52. For ease of illustration the system is shown in two parts connected together as shown at (a), (b), (c) and (d). It will se understood that other functional elements of the system described above may also be present although not shown in FIGS. 2A and 2B.

In summary, embodiments provide an apparatus for generating and storing in a tank a flowable slush of frozen particles usable inter alia in Ice Pigging™. A control system is arranged to monitor an operating parameter of the agitator in the storage tank and to initiate a slush comminution and separation or dewatering cycle when a control parameter based on the operating parameter reaches a threshold value. The control parameter may represent a cumulative energy input to the storage tank. Comminution may be performed prior to separation, with the treatment cycle being terminated when a sensed rheometric parameter of the slush circulating in the treatment flowpath reaches a target value.

In alternative embodiments, the slush pump may be arranged to exert a shearing action on the slush so that it functions as the comminution means. It is preferred however to provide a dedicated comminution mechanism such as a high shear pump as illustrated, together with a slush pump which is optimised for its primary function in moving the slush through the flowpath. The pressure induced by the slush pump advantageously facilitates effective liquid separation and accurate measurement of the sensed rheometric parameter.

In alternative embodiments, comminution and separation may occur sequentially in a single operation, in which case the comminution means might be arranged in the flowpath in advance of the separator. Alternatively, the comminution phase and separation phase may be carried out independently or simultaneously as parallel processes, optionally using separate slush pumps and separate flowpaths. Alternatively, either or both of the comminution and separation processes may be carried out within the storage tank.

The cooling means may comprise any suitable arrangement as known in the art for extracting heat from the liquid 1, whether by a vapour compression or other refrigeration cycle, by direct or indirect contact with a liquid or gaseous refrigerant, or in any other way. The comminution means need not be a pump, but may comprise any functional arrangement as known in the art for reducing the size of the frozen particles in the slush, whether by grinding or other direct mechanical action or otherwise. The sensing means may comprise any transducer or other device for providing an output indicative of the value of the target parameter, whether forming part of another device such as a motor controller or power supply arrangement or as a separate device.

Optionally, the treatment cycle may be initiated responsive to further parameters in addition to the threshold value CPt. For example, it may be preferred to set a minimum time period which must elapse between consecutive treatment cycles, in which case the treatment cycle may be dependent also on a timer input.

Many further possible adaptations within the scope of the claims will be evident to those skilled in the art.

In the claims, reference characters and numerals in parentheses are provided for ease of understanding and should not be construed as limiting features.

What is claimed is:

1. An apparatus for producing a flowable slush (2) of frozen particles, including:
   a cooling means (11) for partially freezing a liquid (1) to form the flowable slush;
   a tank (22) for storing the flowable slush;
   a powered agitator (23) for agitating the flowable slush within the tank;
   a separator (35) for separating a portion of the liquid remaining in the flowable slush stored in the tank from the frozen particles in a separation phase (63) of a treatment cycle;
   a comminution means (40) for comminuting the frozen particles in the flowable slush stored in the tank in a comminution phase (62) of the treatment cycle; and
   a control system (100) for controlling the treatment cycle;
   wherein the control system includes means for sensing at least one operating parameter (OP) of the agitator (23); and
   the control system is configured:
      to monitor a control parameter (CP), wherein the control parameter is based on at least the sensed operating parameter (OP) of the agitator, and
      to initiate the treatment cycle responsive at least to the control parameter reaching a threshold value (CPt).

2. The apparatus according to claim 1, wherein:
   the sensed operating parameter (OP) of the agitator represents a power input to the agitator, and
   the control parameter (CP) represents a cumulative energy input to the flowable slush (2) stored in the tank (22) over a reference time period; and
   the control parameter is based on at least the sensed operating parameter of the agitator over the reference time period.

3. The apparatus according to claim 2, wherein:
   the control system (100) further includes first (27) and second (28) temperature sensors arranged to sense respectively a first temperature (T1) of the liquid or flowable slush and an ambient temperature (T2) external to the tank; and
   the control parameter (CP) is based on at least the sensed operating parameter (OP) of the agitator (23) over the reference time period and a temperature differential ($\Delta T$) between the first and ambient temperatures.

4. The apparatus according to claim 1, wherein the control system is arranged to initiate the treatment cycle with the comminution phase (62).

5. The apparatus according to claim 4, wherein the control system is arranged to initiate the separation phase (63) following the comminution phase (62),
   and to terminate the separation phase responsive at least to a sensed rheometric parameter (RP) of the flowable slush (2) reaching a threshold value (RPt).

6. The apparatus according to claim 5, including at least one slush pump (31) for circulating the flowable slush stored in the tank via each of the separator (35) and the comminution means (40) and back to the tank (22) in the treatment cycle; and wherein
   a rheometric sensing means (42) is arranged in a flowpath of the flowable slush to sense the rheometric parameter of the flowable slush circulating through the flowpath during the treatment cycle.

7. The apparatus according to claim 6, wherein the rheometric parameter (RP) is a pressure of the flowable slush in the flowpath.

8. The apparatus according to claim 7, wherein a separated liquid valve (38) is arranged to control a flow of said portion of the liquid (1) from the separator (35),
   and the control system is arranged to close the separated liquid valve periodically during the treatment cycle and to sense the pressure while the separated liquid valve is closed.

9. A method for producing a flowable slush (2) of frozen particles, including:
   partially freezing a liquid (1) to form the flowable slush;
   storing the flowable slush in a tank (22);
   supplying power to an agitator (23) to agitate the flowable slush within the tank; and
   treating the flowable slush stored in the tank during a treatment cycle, including:
      comminuting the frozen particles in the flowable slush stored in the tank during a comminution phase (62) of the treatment cycle, and
      separating a portion of the liquid remaining in the flowable slush stored in the tank from the frozen particles in a separation phase (63) of the treatment cycle;
   wherein the method further includes:
   sensing at least one operating parameter (OP) of the agitator,
   monitoring a control parameter (CP), wherein the control parameter is based on at least the sensed operating parameter of the agitator, and
   initiating the treatment cycle responsive at least to the control parameter reaching a threshold value (CPt).

10. The method according to claim 9, wherein
    the sensed operating parameter (OP) of the agitator represents the power supplied to the agitator, and
    the control parameter (CP) represents a cumulative energy input to the flowable slush stored in the tank over a reference time period, and the control parameter is based on at least the sensed operating parameter of the agitator over the reference time period.

11. The method according to claim 10, including:
    sensing a first temperature (T1) of the liquid or flowable slush and an ambient temperature (T2) external to the tank; wherein
    the control parameter (CP) is based on at least the sensed operating parameter (OP) of the agitator over the reference time period and a temperature differential ($\Delta T$) between the first and ambient temperatures.

12. The method according to claim 9, wherein the treatment cycle is initiated with the comminution phase (62).

13. The method according to claim 12, including:
sensing a rheometric parameter (RP) of the flowable slush,
initiating the separation phase (63) following the comminution phase (62), and
terminating the separation phase responsive at least to the sensed rheometric parameter reaching a threshold value (RPt).

14. The method according to claim 13, including:
circulating the flowable slush stored in the tank via each of a separator (35) and a comminution means (40) and back to the tank in the treatment cycle; and
sensing the rheometric parameter (RP) of the flowable slush circulating through a flowpath during the treatment cycle.

15. The method according to claim 14, wherein the rheometric parameter (RP) is sensed as a pressure of the flowable slush in the flowpath.

* * * * *